United States Patent [19]

Yoshimi et al.

[11] 4,417,618

[45] Nov. 29, 1983

[54] AIR-CONDITIONER CONTROL SYSTEM FOR VEHICLES

[75] Inventors: Akiro Yoshimi, Kariya; Michihiko Kamiya, Handa; Mitsutoshi Moriya, Gamagori, all of Japan

[73] Assignee: Nippondenso Co., Ltd., Kariya, Japan

[21] Appl. No.: 275,508

[22] Filed: Jun. 19, 1981

[30] Foreign Application Priority Data

Jun. 27, 1980 [JP] Japan .................................. 55-88412

[51] Int. Cl.³ .................. F28D 21/00; F28F 27/00
[52] U.S. Cl. ........................................ 165/12; 165/16;
165/28; 165/42; 165/43; 237/5; 236/91 C;
236/91 D; 236/91 G; 236/49
[58] Field of Search ................. 165/12, 28, 16, 41,
165/42, 43; 237/5, 12.3 R, 12.3 A, 12.3 B;
236/91 C, 91 D, 91 E, 91 F, 91 G, 91 R, 49;
340/57, 600; 364/424, 425; 62/239, 243, 244,
179, 186, 187

[56] References Cited

U.S. PATENT DOCUMENTS 3,934,642  1/1976  Coulson et al. ...................... 165/41
4,271,897  6/1981  Tatemoto ............................. 165/43
4,316,251  2/1982  Saito et al. .......................... 165/42
4,337,821  7/1982  Saito .................................... 165/42
4,358,050  11/1982  Naganoma et al. ................. 236/49

FOREIGN PATENT DOCUMENTS 49-6021   2/1974  Japan .
54-12819  6/1979  Japan .
54-31468  10/1979  Japan .
54-31469  10/1979  Japan .
55-47914  4/1980  Japan .

*Primary Examiner*—William R. Cline
*Assistant Examiner*—John K. Ford
*Attorney, Agent, or Firm*—Cushman, Darby & Cushman

[57] ABSTRACT

An air-conditioner control system for vehicles which is responsive to a condition in the compartment of a vehicle to move an air-flow controlling damper in an air duct. When the supply mode of conditioned air is a heater supply mode and when it is detected that the level of insolation in the vehicle compartment is higher than a predetermined level, the control system alters the supply mode of conditioned air to a bi-level supply mode.

6 Claims, 8 Drawing Figures

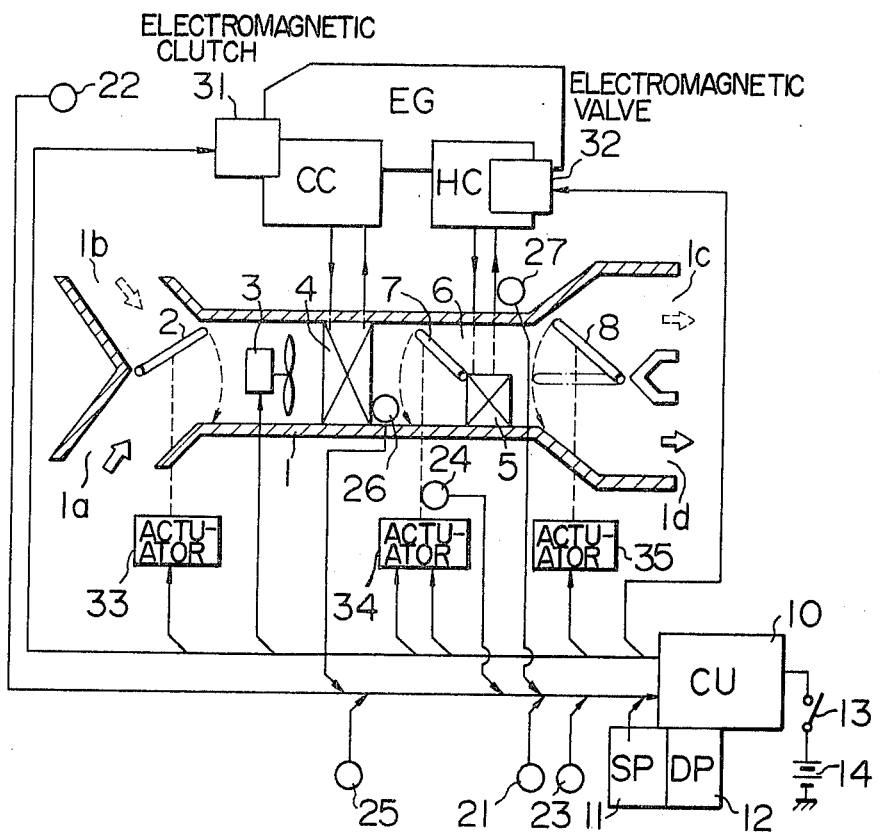
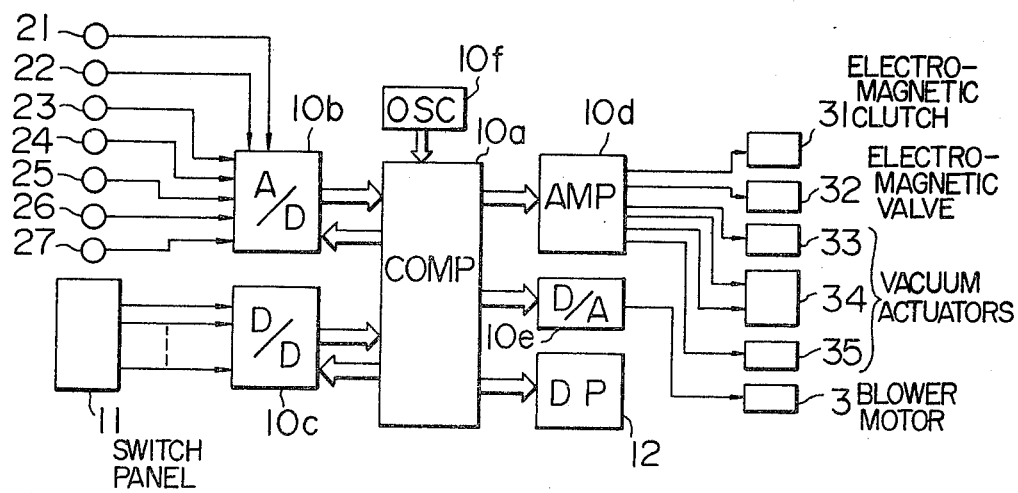

AIR-CONDITIONER CONTROL SYSTEM FOR VEHICLES

BACKGROUND OF THE INVENTION

1. Field of the Invention

The present invention relates to improvements in an air-conditioner control system for vehicles having a plurality of air supply outlets and designed to determine the distribution of conditioned air supplied to a vehicle compartment through the air supply outlets.

2. Description of the Prior Art

It is well known in the art to vary the distribution of air blown into the upper and lower portions of a compartment of a vehicle. For instance, disclosed in Japanese Laid-Open Patent Application Publication No. 55-47914 is a system in which in accordance with the temperature of air to be supplied to the vehicle compartment, the cooled air is chiefly blown into the upper portion of the compartment and the heated air is chiefly blown into the lower portion of the compartment. Also, a similar system is disclosed in Japanese Utility Model Publication No. 54-12819. Thus, in these known systems the heated air is chiefly blown into the lower portion of the vehicle compartment in winter. However, there is a disadvantage that if the occupant is exposed to the heat radiation of the sunlight incident to the vehicle compartment during the heater supply mode of operation, mainly the upper part of the body is exposed to the heat radiation. Sometimes the occupant has a sensation of excessive heating in the upper part of the body and the air supplied from the air conditioner practically fails to reach the upper part of the body, thus failing to lessen the sensation of the excessive heating and thereby deteriorating the feeling on the part of the occupant.

In this connection, air-conditioning systems of the type incorporating an automatic temperature adjusting unit for correcting the supply air temperature in accordance with the intensity of solar radiation or insolation are known in the art (Japanese Utility Model Publication No. 49-6021, etc.), and in accordance with this correction the supply air temperature is decreased in accordance with the degree of insolation with the result that during the above-mentioned heater supply mode of operation the temperature of the air supplied toward the lower part of the occupant's body is decreased causing the occupant to feel cold and this, coupled with a sensation of heating in the upper part of the body, aggravates the feeling on the part of the occupant.

In connection with the air-conditioner control systems stated in Japanese Utility Model Publications No. 54-31468 and No. 54-31469, there is disclosed the method of cancelling or reducing the insolation correction during the heater supply mode of operation with a view to overcoming the foregoing deficiencies due to the insolation correction.

However, this method is also incapable of improving the feeling in the upper part of the occupant's body.

SUMMARY OF THE INVENTION

With a view to overcoming the foregoing deficiencies in the prior art, it is the object of the present invention to provide an improved air-conditioner control system so designed that when an air conditioner is in the heater supply mode of operation and a level of insolation exceeding a predetermined level is sensed, the operation mode of the air outlets is changed to a bi-level supply mode and simultaneously the conditioned air of comparatively low temperature is directed toward the upper part of the occupant's body by effecting the correction for insolation or by virtue of the specific construction of the air conditioner, thus improving the feeling on the part of the occupant.

In the actual application, the basic factors for supply mode selection may include the temperature of supply air or the displacement of a temperature adjusting member as a parameter. Further, whether the cooler unit is in operation and so on may also be included as additional requirements.

BRIEF DESCRIPTION OF THE DRAWING

FIGS. 1 to 7 illustrate a preferred embodiment of the present invention in which the invention is incorporated in an automobile air conditioning system.

FIG. 1 shows the overall construction of the embodiment.

FIG. 2 is a block diagram for the electric circuitry of the control system shown in FIG. 1.

FIG. 3 is a flow diagram showing the processing steps of the digital computer of FIG. 2 which governs the operation of the system.

FIG. 4 is a characteristic diagram showing the relationship between the supply air temperature $T_{AO}$ and the temperature adjusting damper opening $A_s$ for explaining the step 103 in FIG. 3.

FIG. 5 is a characteristic diagram showing the relationship between the supply modes and the supply air temperature $T_{AO}$ for explaining the step 104 in FIG. 3.

FIG. 6 is a characteristic diagram showing the relationship between the supply air temperature $T_{AO}$ and the temperature adjusting damper opening $A_s$ for explaining the step 109 in FIG. 3.

FIG. 7 is a characteristic diagram showing the relationship between the wind rate W and the supply air temperature $T_{AO}$ and the present temperature $T_s$ useful for explaining the step 112 in FIG. 3.

DESCRIPTION OF THE PREFERRED EMBODIMENTS

Figure 3:
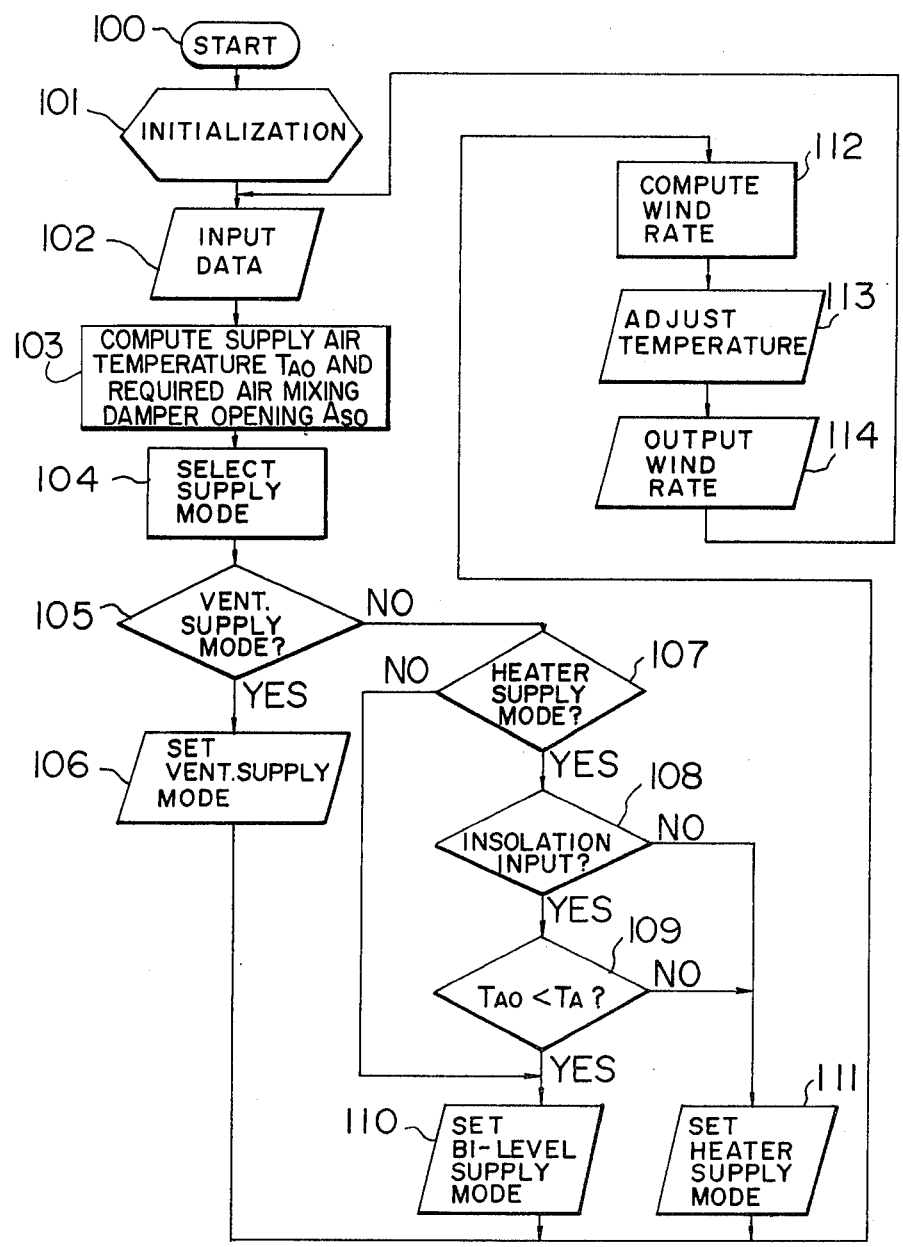

The present invention will now be described in greater detail with reference to the ilustrated embodiments.

The definitions of the technical terms used in connection with the control operation of the air-conditioner control system for vehicles in accordance with the present invention will be described first.

The term "heater supply mode" denotes a condition in which an outlet damper 8 which is disposed near the air supply outlets for the conditioned air from the air conditioner is at the position shown by the solid line in FIG. 1 of the accompanying drawings of the present application and consequently the conditioned air is substantially supplied only through a lower air supply outlet 1d directed to the vehicle compartment floor.

The term "bi-level supply mode" denotes a condition in which the outlet damper 8 is at the position shown by the broken line in FIG. 1 so that the conditioned air of comparatively high temperature is supplied through the lower air supply outlet 1d and the conditioned air of comparatively low temperature is supplied through an upper air supply outlet 1c directed to the vehicle occupant.

The term "ventilation supply mode" denotes a condition in which the outlet damper 8 is at the lowermost position where it closes the lower air supply outlet 1d and consequently the conditioned air is substantially supplied only through the upper air supply outlet 1c.

In the embodiment which will now be described, the present invention is incorporated in an automobile air conditioning system of the conventional cooled and heated air mixing type. In FIG. 1 showing the overall construction of the embodiment, provided upstream of an air duct 1 arranged in the front part of a compartment of a vehicle are an outside air inlet 1a for introducing the outside air and an inside air inlet 1b for recirculating the vehicle compartment inside air and the two inlets are selectively opened and closed by an inside-/outside air damper 2. Arranged downstream within the air duct 1 in the below-mentioned order are a blower motor 3, an evaporator 4 forming a part of the cooling cycle CC, a heater core 5 forming a part of the heating cycle HC of an engine EG and an air mixing (A/M) damper 7 for adjusting the ratio of the air passing through the heater core 5 to the air passing through its bypass passage 6. Provided in the downstream-most portion of the air duct 1 are the upper and lower air supply outlets 1c and 1d for respectively blowing the air conditioned in the duct 1 into the upper and lower portions of the vehicle compartment and the two outlets are opened and closed by the outlet damper 8.

A control unit 10 is provided for the purpose of receiving various information signals, performing various processing steps and electrically commanding the operation of the function elements designated by numerals 1 to 8 so as to perform the desired temperature control and various operation mode controls.

Provided as means of supplying various information signals to the control unit 10 are an inside air temperature sensor 21 including a heat-sensitive resistor for generating an analog voltage signal $T_r'$ corresponding to the sensed inside air temperature in the vehicle compartment, an outside air temperature sensor 22 including a heat-sensitive resistor for generating an analog voltage signal $T_a'$ corresponding to the sensed outside air temperature, temperature setting means 23 including a potentiometer for generating an analog voltage signal $T_s'$ corresponding to a preset temperature, an opening sensor 24 including a potentiometer for generating an analog voltage signal $A_s'$ corresponding to the sensed opening of the air mixing damper 7, an insolation sensor 25 including a phototransistor for generating an analog voltage signal $T_{sun}'$ corresponding to the sensed heat radiation of the sun light incident to the vehicle compartment, a cooled air temperature sensor 26 including a heat-sensitive resistor for generating an analog voltage signal $T_E'$ corresponding to the sensed temperature of the cooled air downstream of the evaporator 4, a water temperature sensor 27 including a heat-sensitive resistor for generating an analog voltage signal $T_w'$ corresponding to the sensed temperature of the heated water flowing through the heater core 5, and a switch panel 11 for generating on/off condition signals in response to the operations of a group of switches, such as, start, stop and operation mode switches.

As provided as means responsive to the electric commands from the control units 10 to operate the function elements are an electromagnetic clutch 31 for switching on and off the driving force from the engine EG to the cooling cycle CC, an electromagnetic valve 32 for opening and closing the cooling water recirculation path to the heater core 5 in the heating cycle HC and electromagnetic valve controlled vacuum actuators 33, 34 and 35 responsive to the engine negative pressure to apply the opening/closing drive force to the inside/outside air damper 2, the air mixing damper 7 and the outlet damper 8. The purpose of a display panel 12 is to indicate the operating condition of the air conditioner in response to the output signal of the control unit 10.

When a vehicle ignition switch 13 is closed, the control unit 10 is supplied with electric power from a vehicle battery 14 and the control unit 10 is placed in condition for operation.

As shown in FIG. 2, the control unit 10 comprises a digital computer or microcomputer 10a for performing the required information processing in accordance with a predetermined control program, an analog input interface 10b in which the analog voltage signals from the signal input means 21, 22, 23, 24 and 25 are selectively subjected to analog-to-digital conversion and applied to the computer 10a, a digital input interface 10c in which the switch on/off condition signals from the switch panel 11 are reshaped and applied to the computer 10a, an amplifier circuit 10d for amplifying the operation command signals generated from the computer 10a to be supplied to the function elements 31 to 35, a digital-analog converter circuit 10e in which the digital value generated from the computer 10a to indicate the desired rotational speed of the blower motor 3 is converted to a DC voltage for operating the blower motor 3, an information processing clock generating circuit 10f, a voltage regulator circuit (not shown), a display panel 12 for indicating the operating condition of the air conditioner, and a starting circuit (not shown) for initiating the operation of the computer 10a just after the closing of the ignition switch 13.

FIG. 3 shows the flow of the computing steps of the control program for the computer 10a and the operation of the system will now be described with reference to FIG. 3.

When the ignition switch 13 is closed, the computer 10a is started and thereafter the computer 10a repeatedly checks through the interface 10c whether the air conditioner operating switch in the switch panel 11 is on.

When the operating switch in the switch panel 11 is closed, a start step 100 causes the computer 10a to start the processing which will be described hereunder. Firstly, an initialization step 101 sets the internal conditions of the computer 10a and the operating condition of the air conditioner to their initial conditions. This step energizes the electromagnetic clutch 31 and the electromagnetic valve 32 via the amplifier circuit 10d and thereby initiates the operation of heat exchange in the heat exchangers 4 and 5. By the next data input step 102 the analog voltage signals $T_r'$, $T_a'$, $T_s'$, $A_s'$, $T_{sun}'$, $T_E'$ and $T_w'$ respectively generated from the signal input means 21, 22, 23, 24, 25, 26 and 27 are successively received as digital data $T_r$, $T_a$, $T_s$, $A_s$, $T_{sun}$, $T_E$ and $T_w$ via the interface 10b and the operating conditions of the operation mode switches in the switch panel 11 are received via the interface 10c.

Figure 4:
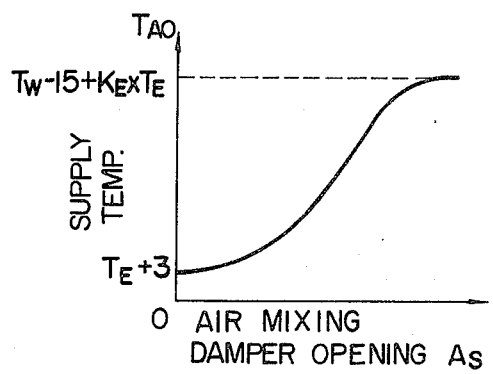

In the next step 103 the supply air temperature $T_{AO}$ required for attaining the preset temperature is computed from the following preliminarily programmed expression $$T_{AO} = K_s \cdot T_s - K_r \cdot T_r - K_a \cdot T_a - K_{sun} \cdot T_{sun} + C$$

where $K_s$, $K_r$, $K_a$, $K_{sun}$ and C are preset constant terms. Then the required opening $A_{so}$ of the air mixing damper 7 for attaining the computed supply air temperature $T_{AO}$ is computed. The computing method may be to use a predetermined expression approximating the supply air temperature $T_{AO}$ versus air mixing damper opening $A_s$ characteristic of FIG. 4 which was preliminarily obtained by experiments or to preliminarily memorize the characteristic in the form of a memory map. In FIG. 4, symbol $T_w$ indicates the heated water temperature (by the sensor 27), $T_E$ the cooled air temperature (by the sensor 26), and $K_E$ a constant term.

Figure 5:
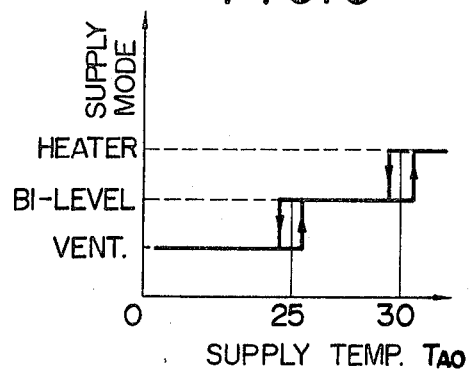

The next step 104 selects the proper supply mode corresponding to the computed supply air temperature $T_{AO}$. This selection is effected by determining which of the regions defined by 25±1° C. and 30±1° C. as shown in FIG. 5 corresponds to the computed supply air temperature $T_{AO}$.

Figure 6:
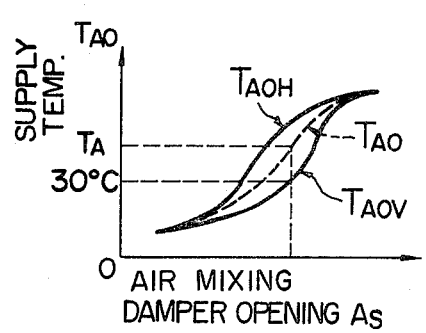

The next steps 105 to 111 are such that if the supply mode selected by the step 104 is the ventilation supply mode, a command is applied (by the step 106) to the actuator 35 to open the upper outlet 1c. If the bi-level supply mode is selected, a command is applied (by the step 110) such that the conditioned air is supplied in a bi-level manner or the damper 8 is placed in the intermediate position shown by the broken line. In the event that the heater supply mode is selected, if there is no insolation, a heater supply mode command is applied (by the step 111). If there is detected the presence of insolation of a level higher than a predetermined level, in accordance with the bi-level supply temperature characteristic (see FIG. 6) the step 109 determines whether a condition that a ventilation supply air temperature $T_{AOV}$ is less than 30° C. (namely, a supply air temperature $T_{AO}$ is less than a predetermined value $T_A$) is satisfied. If $T_{AO} < T_A$, the supply mode is changed to the bi-level supply mode (by the step 110). If the ventilation supply air temperature $T_{AOV}$ is equal to or higher than 30° C., that signifies $T_{AO} \geq T_A$, the heater supply mode is maintained (by the step 111). In this connection, FIG. 6 shows a condition where in the bi-level supply air mode the heater supply temperature $T_{AOH}$ differs in value from the ventilation supply air temperature $T_{AOV}$. For the purpose of obtaining such a characteristic, the arrangement of the air mixing damper 7, the heater core 5, etc., in the air conditioner unit may be suitably preset or alternatively a known construction may for example be used in which a special auxiliary duct leads from the downstream portion of the evaporator 4 to the upper outlet 1c to bypass the air mixing damper 7 and the heater core 5 so that the valve in the auxiliary duct is opened interlinked with the outlet damper 8 in the bi-level supply mode.

Thus, by the action of the system the supply air temperature $T_{AO}$ is determined such that the vehicle compartment temperature $T_r$ is brought near to and maintained at the preset desired temperature $T_s$, and the opening $A_s$ of the air mixing damper 7 is adjusted accordingly. In accordance with the thus determined supply air temperature $T_{AO}$, the heater supply mode, the ventilation supply mode or the bi-level supply mode is selected. In the event that the heater supply mode has been selected, if the detected level of insolation is greater than a predetermined value, the bi-level supply mode is selected automatically so far as the ventilation supply air temperature $T_{AOV}$ from the upper outlet (the ventilation outlet) remains lower than a predetermined temperature of 30° C., for example.

In this way, it is possible to eliminate any sensation of excessive heating in the upper part of the occupant's body exposed to the heat radiation of the sun light while blowing the heated air toward the lower part of the occupant's body. In addition, the system prevents the high-temperature heated air from being blown toward the upper part of the occupant's body.

Figure 7:
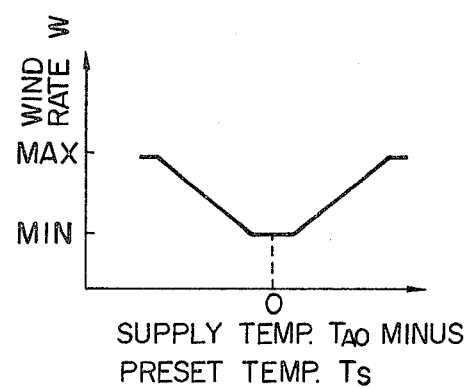

Then, in accordance with a predetermined relationship or memory map, a step 112 performs the computation of a wind rate W from the supply air temperature $T_{AO}$ on the basis of the characteristic shown in FIG. 7.

A step 113 controls the actuator 34 so as to attain the opening $A_{so}$ of the air mixing damper 7 which was computed by the step 103, thus causing the opening $A_s$ of the air mixing damper 7 to become the opening $A_{so}$ for performing the temperature adjustment. Then, a step 114 applies a digital value to the digital-analog converter circuit 10e so as to supply to the blower motor 3 an applied voltage corresponding to the wind rate W computed by the step 112.

The above-described computational operations by the steps 102 to 114 are performed repeatedly at a period which is usually sufficiently short and which is determined by the operating clock frequency of the computer 10a. Immediately when the stop switch in the switch panel 11 is closed or the ignition switch 13 is opened during the execution of these computational operations, all the processing of FIG. 3 is stopped and the computer 10a and the air conditioner are restored to their conditions before the initialization by the step 101.

The control of the inside/outside air damper 2 and the control of the electromagnetic clutch 31 and the electromagnetic valve 32 will not be explained since they have no bearing on the subject matter of the present invention.

While, in the above-described embodiment, the digital computer is used, it may be replaced with analog circuitry.

Figure 8:
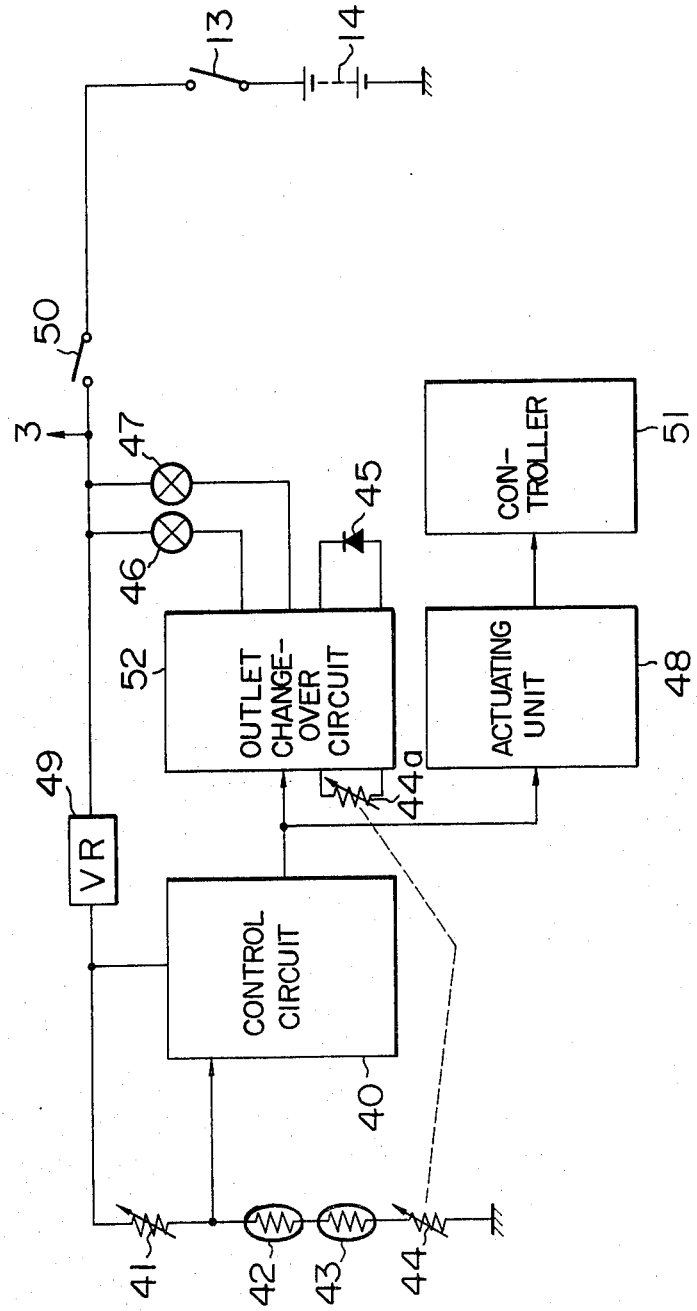
FIG. 8 is a block diagram for the electric circuitry of a control system in another embodiment of the present invention.

FIG. 8 shows another embodiment for this purpose. In the Figure, numeral 40 designates a known type of control circuit comprising an operational amplifier or the like, and a temperature setting variable resistor 41, an inside air temperature sensor 42, an outside air temperature sensor 43 and a feedback potentiometer 44 associated with the air mixing damper are connected in series as input resistors for the control circuit 40. The known type of control circuit 40 applies to an actuating unit 48 a signal corresponding to the difference between the preset value of the temperature setting resistor 41 and the combined resistance of the other resistors 42 to 44 and the actuating unit 48 actuates a controller 51 adapted to adjust for example the opening of the air mixing damper, thus performing the temperature adjustment so as to reduce the difference to zero. Numeral 49 designates a voltage regulator circuit, and 50 an operating switch which is closed to bring the blower motor 3, the actuating unit 48, etc., into operation.

Numeral 52 designates an outlet change-over circuit responsive to the output of the control circuit 40 so as to operate electromagnetic valves 46 and 47 forming the actuator 35 and change the position of the outlet damper. An insolation sensor 45 comprising a photodiode senses the intensity of insolation so that if there is insolation and a condition of greater than 300 Kcal/m² of insolation is sensed, the electromagnetic valves 46 and 47 are automatically energized to change the supply mode to the bi-level supply mode and thereby to maintain the damper opening detected by the potentiometer 44a below a predetermined value (i.e., the ventilation outlet temperature is maintained lower than 30° C. in the bi-level supply mode).

In addition, the present invention may be embodied in a system which includes no automatic supply mode change-over mechanism and which simply indicates a suitable supply mode to the occupants by means of a display or other alarming device.

It will thus be seen from the foregoing that in accordance with the present invention, the presence of insolation is used as a condition for supply mode change-over, thus preventing the deterioration of feeling due to insolation during the heater supply mode of operation and thereby ensuring a feeling of comfortable air conditioning on the part of the occupants.

We claim:

1. An air conditioning system for a vehicle compartment of an automotive vehicle comprising:

an air duct having an inlet for receiving air to be conditioned and a first and a second outlets for supplying conditioned air into the vehicle compartment, said first and second outlets being directed to an upper and a lower portion of the vehicle compartment, respectively;

an air conditioner for cooling and heating air received through said inlet of said air duct to supply conditioned air through said first and second outlets of said air duct;

an air distributing damper positioned in said air duct downstream of and in cascade with said air conditioner to be movable to a first, second and third positions, said damper substantially closing said second outlet of said air duct at said first position thereof to supply conditioned air of a comparatively low temperature through said first outlet of said air duct, said damper substantially closing said first outlet of said air duct at said second position thereof to supply conditioned air of a comparatively high temperature through said second outlet of said air duct, and said damper further permitting, at said third position thereof, said first and second outlets of said air duct to supply conditioned air of comparatively low and high temperatures through said first and second outlets of said air duct, respectively;

first means for setting a desired temperature in the vehicle compartment;

second means sensing an actual temperature in the vehicle compartment;

third means sensing an insolation level in the vehicle compartment;

first control means controlling the rate of cooling and heating of said air conditioner to effect a temperature of the conditioned air on the basis of the desired temperature along with other conditional temperature information including an output signal of said third means; and second control means controlling the position of said air distributing damper in relation to the controlled rate of cooling and heating of said air conditioner, said second control means controlling said air distributing damper to move from said second position to said third position when insolation of a level higher than a predetermined level in the vehicle compartment is sensed by said third means and said air distributing damper is at said second position thereof.

2. A system according to claim 1, wherein the controlling of said second control means is effected upon determination that the temperature of the conditioned air is lower than a predetermined temperature.

3. A system according to claim 1, wherein said air conditioner comprises an evaporator, a heater core, a bypass passage and an air mixing damper, and, when said air distributing damper is at said third position thereof, said first outlet of said air duct communicates with said bypass passage and said second outlet of said air duct communicates with said heater core, and the temperature of conditioned air supplied through said first outlet of said air duct is lower than the temperature of conditioned air supplied through said second outlet of said air duct.

4. An air conditioning system for a vehicle compartment of an automotive vehicle comprising:

an air ducting having an inlet for receiving air to be conditioned and a first and a second outlets for supplying conditioned air into the vehicle compartment, said first and second outlets being directed to an upper and a lower portion of the vehicle compartment, respectively;

an air conditioner for cooling and heating air received through said inlet of said air duct to supply conditioned air through said first and second outlets of said air duct;

an air distributing damper positioned in said air duct downstream of and in cascade with said air conditioner to be movable to a first, second and third positions, said damper substantially closing said second outlet of said air duct at said first position thereof to supply conditioned air of a comparatively low temperature through said first outlet of said air duct, said damper substantially closing said first outlet of said air duct at said second position thereof to supply conditioned air of a comparatively high temperature through said second outlet of said air duct, and said damper further permitting, at said third position thereof, said first and second outlets of said air duct to supply conditioned air of comparatively low and high temperatures through said first and second outlets of said air duct, respectively;

first means for setting a desired temperature in the vehicle compartment;

second means sensing an actual temperature in the vehicle compartment;

third means sensing an insolation level in the vehicle compartment; and a microcomputer and input/output means thereof functioning so that, when a temperature of conditioned air supplied through said air supply outlets has been computed and the supply mode has been selected to be a heater supply mode in accordance with the computed supply air temperature, an alteration from the heater supply mode to the bi-level supply mode is effected upon detection that the level of insolation in said vehicle compartment is higher than the predetermined level and upon determination that the computed supply air temperature is lower than a predetermined temperature.

5. A system according to claim 4, wherein said microcomputer has another function of generating command signals for the adjustment of a wind rate and a temperature of conditioned air supplied through said air supply outlets.

6. A system according to claim 4, wherein said air conditioner comprises an evaporator, a heater core, a bypass passage and an air mixing damper, and, when said air distributing damper is at said third position thereof, said first outlet of said air duct communicates with said bypass passage and said second outlet of said air duct communicates with said heater core, and the temperature of conditioned air supplied through said first outlet of said air duct is lower than the temperature of conditioned air supplied through said second outlet of said air duct.

* * * * *